W. E. E. ANDERSON.
LINK BELTING.
APPLICATION FILED JULY 17, 1919.

1,334,926. Patented Mar. 23, 1920.

Inventor-
W. E. E. Anderson,
By P. Singer, Atty.

UNITED STATES PATENT OFFICE.

WILLIAM E. E. ANDERSON, OF OXFORD, ENGLAND.

LINK BELTING.

1,334,926.     Specification of Letters Patent.     Patented Mar. 23, 1920.

Application filed July 17, 1919. Serial No. 311,636.

*To all whom it may concern:*

Be it known that I, WILLIAM ELLERY ELBERT ANDERSON, a subject of the King of Great Britain, residing at Oxford, England, have invented new and useful Improvements in Link Belting, of which the following is a specification.

This invention relates to link belting of that kind which consists of leather links joined in pairs by a metal link provided with pins which fit into holes in the leather links, the links being kept together by means of screw rivets which pass through the leather links between the ends of the metal links.

Experience has shown that belting of this type, particularly when used on motor road vehicles for short drives is apt to stretch and consequently lose its driving power owing to the extensibility of the leather links and the main object of the present invention is to overcome this disadvantage. This object is obtained by providing the leather or other extensible link with an inextensible backing, lining or reinforcement. Such inextensible backing, lining or reinforcement may for example take the form of plates of metal or other suitable material more or less of the same shape as the opposing surfaces of the leather links to which they are attached in any suitable manner. In this constructional form of my invention each of the said plates is provided with holes that may be stamped out of the metal of the plate in the form of bosses through which the pins of the metal links pass and the plates may be rigidly attached to the leather links by means of the screw rivets employed for keeping the said links together.

My invention will however be better understood by reference to the accompanying drawing in which:—

Similar letters of reference relate to like parts in all the figures of the drawing.

Figure 1:
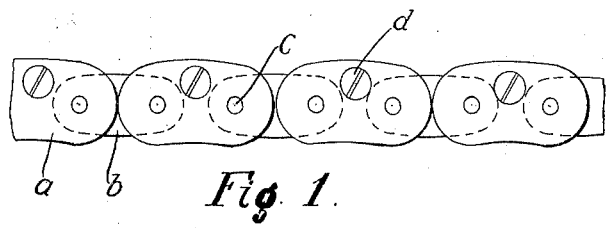
Figure 1 is a side view of a link belt provided with my improvements.
Figure 2:
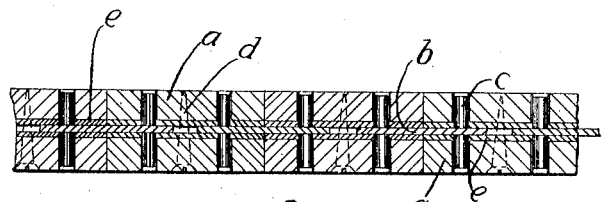
Fig. 2 is a plan view of the same, mainly in section.

Referring to the said drawing $a$ represents the leather links, $b$ the metallic links with pins $c$, and $d$ the screws for keeping the links together. The reference letter $e$ designates the inextensible backing, lining or reinforcement provided in accordance with my invention and which in the construction shown in Fig. 2 takes the form of metal plates $e$ of the same cross sectional shape as the leather links $a$ and inserted between the same as shown, said plate $e$ being provided with holes for the pins $c$ and screws $d$.

Figures 3, 4:
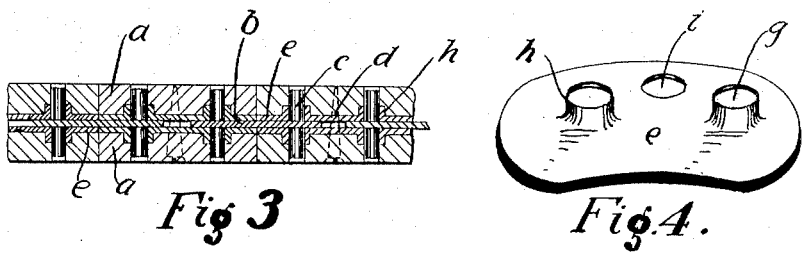
Fig. 3 is a similar view to Fig. 2 but showing a preferred construction of the metal plate forming the reinforcement.
Fig. 4 is a perspective view of the said plate drawn on a larger scale.

Figs. 3 and 4 show the preferred form of the metal plate $e$ which I employ for the purposes of my invention. In the construction shown in these figures the plate $e$ is provided with holes $g$ which are stamped out so as to form the bosses $h$ through which the pins $c$ of the metal links $b$ are passed. Holes $i$ are likewise provided in the plates $e$ for the screws $d$. Link belting assembled as shown in Fig. 3 with the particular form of metallic reinforcement illustrated in Fig. 4 not only possesses the desirable feature of non-extensibility, but is also considerably improved from the wear-resisting point of view; in fact I have found that the addition of the metallic plate $e$ adds considerably to the life of the belt.

Figure 5:
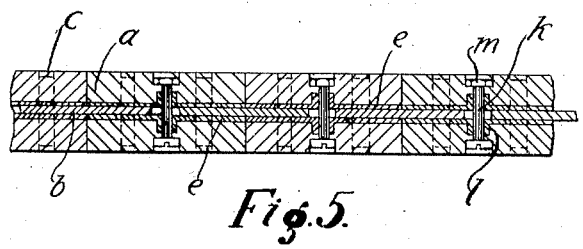
Fig. 5 is also a similar view to Fig. 2 showing another alternative construction of the metallic reinforcement.

An alternative method of construction is shown in Fig. 5. In this form the pins $c$ of the metal links $b$ pass through holes in the plates $e$ as in the construction illustrated in Fig. 2 but instead of the screws $d$ I employ bolts $k$ for keeping the links $a$ and $b$ together, said bolts $k$ passing through the bosses $l$ which are stamped out of the metal plates $e$, suitable countersunk holes $m$ being provided in the leather links $a$ for the reception of the heads and nuts of the bolts $k$.

Claim:

Link belting comprising in combination metal links, leather links joined in pairs by said metal links, metallic reinforcing plates for said leather links, said plates being provided with holes and with bosses around said holes and embedded in said leather links, pins on said metal links fitting into holes in said leather links and passing through the bosses in said plates and screw rivets passing through said leather links and said plates.

In witness whereof I affix my signature.

W. E. E. ANDERSON.